July 30, 1968 E. E. MASTERSON 3,394,929

UNIT RECORD HANDLING DEVICE

Filed July 19, 1965 5 Sheets-Sheet 1

INVENTOR
EARL E. MASTERSON

BY
John J. McCormack
ATTORNEY

UNIT RECORD HANDLING DEVICE

Filed July 19, 1965 5 Sheets-Sheet 2

INVENTOR
EARL E. MASTERSON

BY
John J. McCormack
ATTORNEY

July 30, 1968 E. E. MASTERSON 3,394,929

UNIT RECORD HANDLING DEVICE

Filed July 19, 1965 5 Sheets-Sheet 3

INVENTOR
EARL E. MASTERSON

BY

John J. McCormack
ATTORNEY

INVENTOR
EARL E. MASTERSON
BY
John J. McCormack
ATTORNEY

INVENTOR
EARL E. MASTERSON
BY
John J. McCormack
ATTORNEY

United States Patent Office 3,394,929
Patented July 30, 1968

3,394,929
UNIT RECORD HANDLING DEVICE
Earl E. Masterson, Newtonville, Mass., assignor to Honeywell Inc., Minneapolis, Minn., a corporation of Delaware
Filed July 19, 1965, Ser. No. 473,032
17 Claims. (Cl. 271—3)

ABSTRACT OF THE DISCLOSURE

A document receptacle including a base extended to form a top working surface of a document handling apparatus; this apparatus including a high speed document picker, the receptacle being tilted downward toward the picker and including a side rail for aligning documents relative thereto this side rail being adjustably translatable for documents of two different lengths.

A general object of the present invention is to provide a new and improved data processing device for handling unit records, especially records of the punched card type. More specifically, the invention relates to a unit record handling device, which is characterized by an improved record receptacle adapted to better direct records for picking, for subsequent processing and the like.

Manipulation of unit records, such as punched cards, is often required in the operation of a data processing system. For instance, a card reader commonly is used to supply data to a computer by sensing the "hole-encoded" information recorded on punched cards. At present, card readers and other such unit record handling apparatus are much too slow and constitute a major obstacle to increasing overall data processing speeds. Thus, workers in the art have long been interested in improving the speed of card readers and other record handling apparatus. One cause of slow card-handling relates to operating convenience.

Convenience of operation is significant for unit record handling machines, which, more than most other data processing sub-systems, require a good deal of operator attention. For instance, operator intervention is required to stack cards into the input hopper, to remove them from the output hopper (stacker), to transfer cards between hoppers and to monitor or manipulate controls on a control panel. Therefore, it is highly important to design a unit record handling machine to the operated with a minimum of operator time and effort. For example, it is very advantageous to locate operating stations, controls, and record stacks within easy reach of an operator and to be convenient for insertion or removal of records. Prior art machines have exhibited many shortcomings in this respect however.

It will be recognized that a function of input hoppers in card-handling machines is to receive packets of cards and direct them in a prescribed attitude toward card-selection means (e.g. a card picker). Ideally, such input hoppers allow the operator to inject card packets with a minimum of effort or skill, and also serve to automatically pre-align the cards somewhat, prior to picking. However, prior art card hoppers have employed card-aligning and card-advance mechanisms which fail to satisfy the above objectives and are relatively complex and inconvenient to use. For instance, as best appreciated from FIGURE 1, prior art input hoppers have conmonly been provided with card-aligning guides (e.g. the sides 11, 11' forming chute 1 in FIGURE 1) that force the attendant to employ a marksman's skill to insert a packet of cards and also to precisely pre-align them. Prior art input hoppers have also failed to urge cards into alignment along both their length and height dimensions without resorting to cumbersome devices such as stack jogglers, for shaking the entire card stack (not joggler 14 in FIGURE 1). The present invention dispenses with such guide chutes, stack jogglers and other such complex and inconvenient mechanisms by employing simply an inclined platform with a single guide rail for the input hopper.

Tilting such a hopper according to the invention also improves accessibility thereto and allows one to load it more quickly and conveniently, especially when one siderail is also eliminated. It will be recognized that the input hoppers in prior art card-handling machines are inconvenient both for inserting card-stacks generally and particularly for inserting a few cards at a time. That is, since prior art input hoppers customarily comprise a chute (as noted above) which requires pre-alignment of cards for insertion therein, they commonly require a separate jogging surface on which the operator can so pre-align the cards. These problems disappear when using the input hopper design according to the invention whereby the joggling surface is merged into a hopper base, is tilted and one hopper siderail is eliminated, to thereby "open-up" the hopper for unobstructed access thereto, and with no need to "aim" cards. Card pre-alignment is also eliminated since the cards are made self-aligned and more stable. The invention thus makes it especially convenient to transfer cards between input and output stacks, e.g. for re-reading. The V hopper resulting from this tilting and side removal sacrifices no aligning capabilities, but conversely makes the inserted cards self-aligning in two directions, against a V-base. The V-base also helps to normalize the load on a picker, making it especially apt for use with flexibly-pivoted picker knives without providing a buffer station.

This tilting feature is optimized by inclining the tilted hopper vertically so that inserted cards will be gravity-urged to slide down the hopper and engage picker means. This inclination helps to render cards self-aligning along the input hopper axis, i.e. coplanar with the "picking-plane." Hopper inclination also extends the surface area of hopper-to-card engagement for improved card braking and control whereby the gravity-fed cards are continuously and gradually advanced. The latter feature helps dispense with the need for buffer stations which are commonly used (e.g. station 15 in FIGURE 1). These buffer mechanisms are commonly necessary for prior art input hoppers to reduce and normalize the card-feeding forces, urging cards against the picker means. However, such buffer means are relatively complex and especially inconvenient to use since they block access to cards adjacent the picker means. For instance, the input buffer station 15 in machine 10 (FIGURE 1), while necessary to reduce the force of stack against picker 13, makes it virtually impossible to insert cards therein, thus making single-card feeding very difficult. The present invention dispenses with buffer stations and "opens-up" input hoppers for access thereto by the novel V-shaped inclined hopper configuration which affords self-normalizing card-to-hopper engagement. Thus, it is an object of the invention to provide a record handling apparatus characterized by the inclusion of an inclined, V-shaped card-input hopper.

According to a related feature, the inclined base surface of the tilted hopper is extended toward the output hopper to constitute an inclined machine surface, e.g. a working table for card joggling, for mounting machine controls, and the like. Such an inclined surface both opens-up access to the associated hopper, making it coplanar with the work surface and removing obstacles therebetween. It also brings more machine elements closer to the operator. Thus, another object of the invention is to provide such a hopper having a base portion comprising a mere extension of an inclined, top surface of a card handling machine.

Operating convenience is further enhanced by another feature relating to hopper tilting, namely provision of a pivotable hopper siderail, the pivoting of which can effect the automatic conversion of the machine to handle different card sizes. Addition of a rail actuated switch provides automatic indication of input card size. For instance, such a pivotable siderail has been used to advantage for quickly adapting a card reader in-feed hopper from "80-column" to "51-column" lengths of punched cards.

The invention also serves to shorten and straighten-out transport paths according to this tilted V-shaped input hopper which "pre-turns" input cards, pointing them toward an output destination, such as ejection means feeding an output hopper. It will become apparent that such tilting is also compatible with desirable "broadside" feed-serial process" transport modes and can straighten and simplify transport paths in an unobvious manner. For instance, by merely twisting an input hopper (e.g. hopper I', FIGURE 2) about 45° to converge toward the output hopper (hopper O) and also tilting it about 45° about its own axis ($s_1$) according to the invention, one can reduce the total necessary transport turns from 180° to a mere 45°.

Thus, many problems are resolved by tilting a hopper portion of a record processing machine according to the invention and by also vertically inclining the tilted hopper. Thus, it is an object of the invention to provide an arrangement whereby a record input hopper is V-shaped, being tilted somewhat and also inclined vertically for improved accessibility and feeding efficiency. Another object of the invention is to provide such an arrangement wherein the hopper base is extended to form a coextensive inclined working surface on top of a machine. Yet, another object of the invention is to provide a unit record handling apparatus having a more accessible and conveniently arranged input hopper. Still another object is to provide such a hopper including a pivotable siderail means as one card-base in a V-shaped hopper. Another object is to arrange machine controlling switch means in operative association with such a siderail .

The foregoing objects and features of novelty which characterize the invention as well as other objects of the invention are pointed out with particularity in the claims annexed to, and forming a part of, the present specification. For a better understanding of the invention, its advantages and specific objects attained with its use, reference should be had to the explanations associated with the accompanying drawings, in which there are illustrated and described preferred embodiments of the invention.

The objects of the invention are achieved by the provision of record collecting means which is tilted to form a V-shaped receptacle, having orthogonal base portions with no side portions; and other input hopper features whereby the lateral and vertical access thereto by an operator is facilitated and whereby the intra-machine transport path is shortened and straightened.

Figure 1:
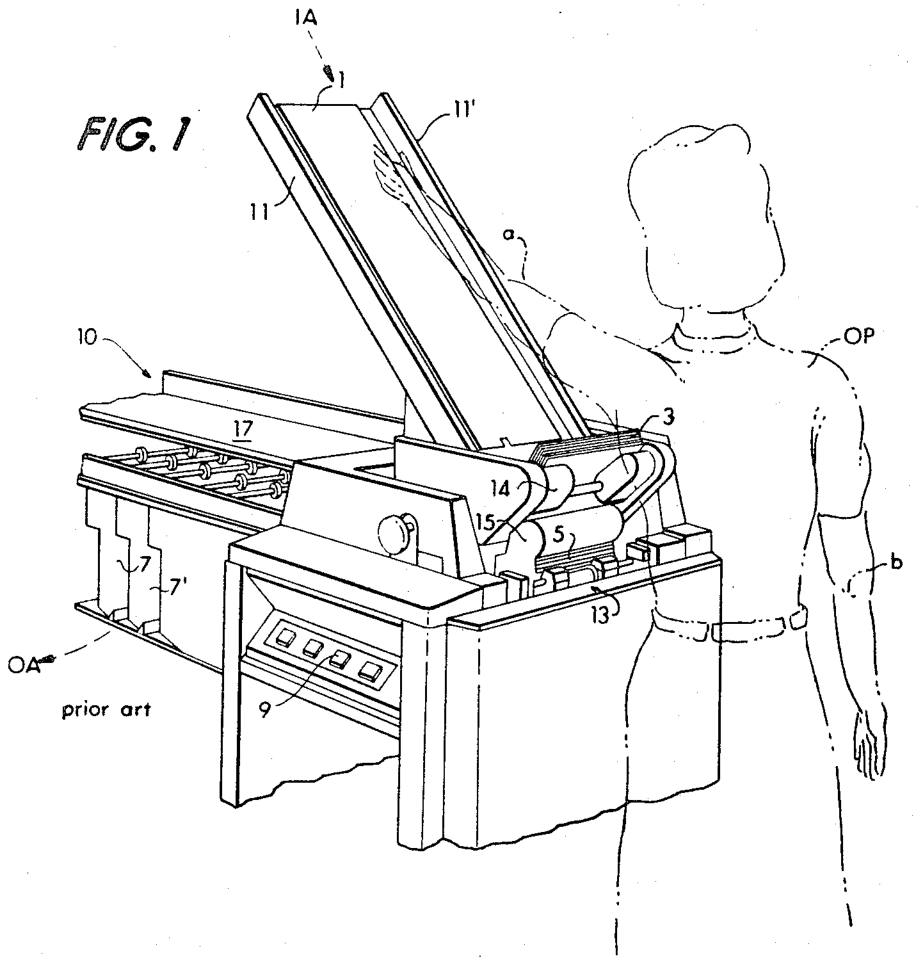
FIGURE 1 is a schematic perspective view of a typical prior art unit record handling apparatus.

FIGURE 1 shows a typical prior art unit record handling machine, i.e. a card reader 10, illustrating some prior art problems which are met by the invention. It will be recognized that card reader 10 includes an input station comprising a picker mechanism 13 arranged to engage cards fed along input axis IA of a card injection means comprising input hopper 1. Hopper 1 is arranged to receive an input card stack 3 and leads to a buffer station 15 containing an intermediate card stack 5, directly engaging picker 13. It will be recognized that input hopper 1 has a pair of side portions 11, 11' spaced to closely surround the edges of cards of a given length for pre-alignment purposes. A card joggler 14 is also provided for pre-picking alignment. Thus, the operator, or machine attendant OP, must select a stack of cards, manually pre-align them, (e.g. on a work table 17), reach upwardly (depending on length of stack 3) and carefully aim the stack for insertion between sidewalls 11, 11'. The cards are transported and processed within machine 10 to be delivered along an output, or stacking, axis OA at a plurality of output hoppers, or pockets 7, 7'. It will be noted that the cards in the output hoppers are deposited to rest along a different (bottom) edge than those in the input stack 3 or in buffer stack 5 and thus have to be flipped or pivoted, about a turn of at least 90° along the transport path between hoppers 1 and 7, 7'. The intra-machine card manipulation, processing etc. may be controlled through a keyboard on a control panel 9 by attendant OP.

This above will be seen to illustrate a common hopper arrangement which is relatively slow, inconvenient and unnecessarily fatiguing for an attendant to service, for instance because of the vertical and lateral space between operative elements, such as hoppers 1, 7, controls 9 and table 17. For instance, obvious exertions are required of an attendant, stretching upward and outward, to pile stacks of cards into input hopper 1, first having joggled the stack on table 17 and then walked around to the position shown. Further, the attendant must aim the stack carefully to fit between sides 11, 11'; must strain, or move around the machine, to monitor or manipulate control panel 9; and must thereafter move around the machine and stoop downward to inspect or retrieve processed cards in output stacker hoppers 7, 7'. This servicing procedure is a time-motion study in actions which are as fatiguing as they are unnecessary. It is virtually impossible for the operator of such a card-handling machine to position herself in any single position from which she can load cards into hopper-chute 1, can monitor control panel 9, can use table 17 and can manipulate cards in output stackers 7, 7' without straining or moving. Thus, seated operation is ruled out, for instance. In addition to this inconvenient lateral layout, FIGURE 1 also illustrates an inconvenient vertical layout that is unfortunately prevalent in the art. The upward and downward reaching, stooping and lifting this arrangement imposes on an operator in the course of handling cards in the input and output hoppers is obviously undesirable, detracting from her efficiency and speed, while also unnecessarily tiring her.

Illustrative card-handling machine 10 discloses another associated difficulty exhibited by conventional input hoppers, namely "hopper-inaccessibility." Input hopper 1 typically has a pair of sidewalls 11, 11' spaced little more than a card-length apart to align the cards prior to their being fed to picker 13. Workers in the art will recognize that such a typical "card-chute" is problematical to load, since closely-spaced walls 11, 11' require that, when an operator grips a stack of cards to insert them into the hopper 1, she must be sure that their side-edges are in relatively close registration so as to fit between walls 11, 11'. As before-noted, this requires that the operator joggle or align the card deck, a fussy, interruptive step in computer operation that requires two hands, takes time, etc. For joggling purposes, it is also cutomary to provide a joggling table 17 in prior art machines. It would be preferable, of course, to dispense with the need for both this joggling step and the associated work surface. The invention improves vertical layout and hopper accessibility as seen below, and also alleviates the need for card-joggling.

Figure 2:
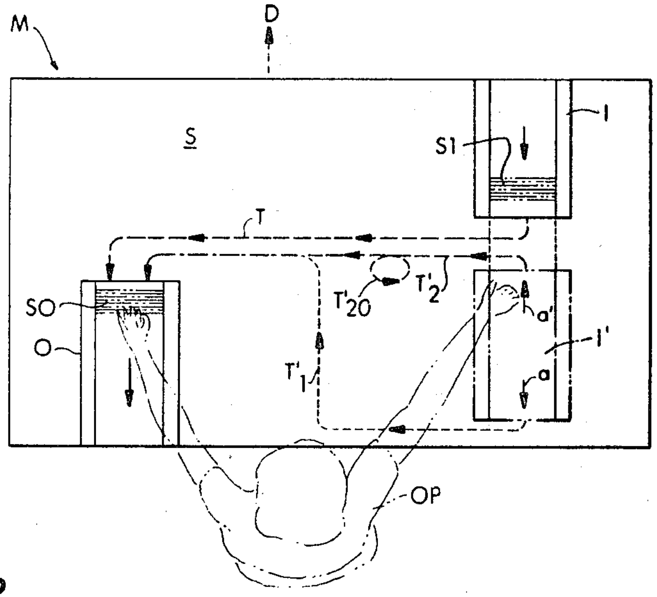
FIGURE 2 is a schematic plan view of a record handling apparatus having a hopper arrangement which illustrates some of the problems associated with the invention.
Figure 3:
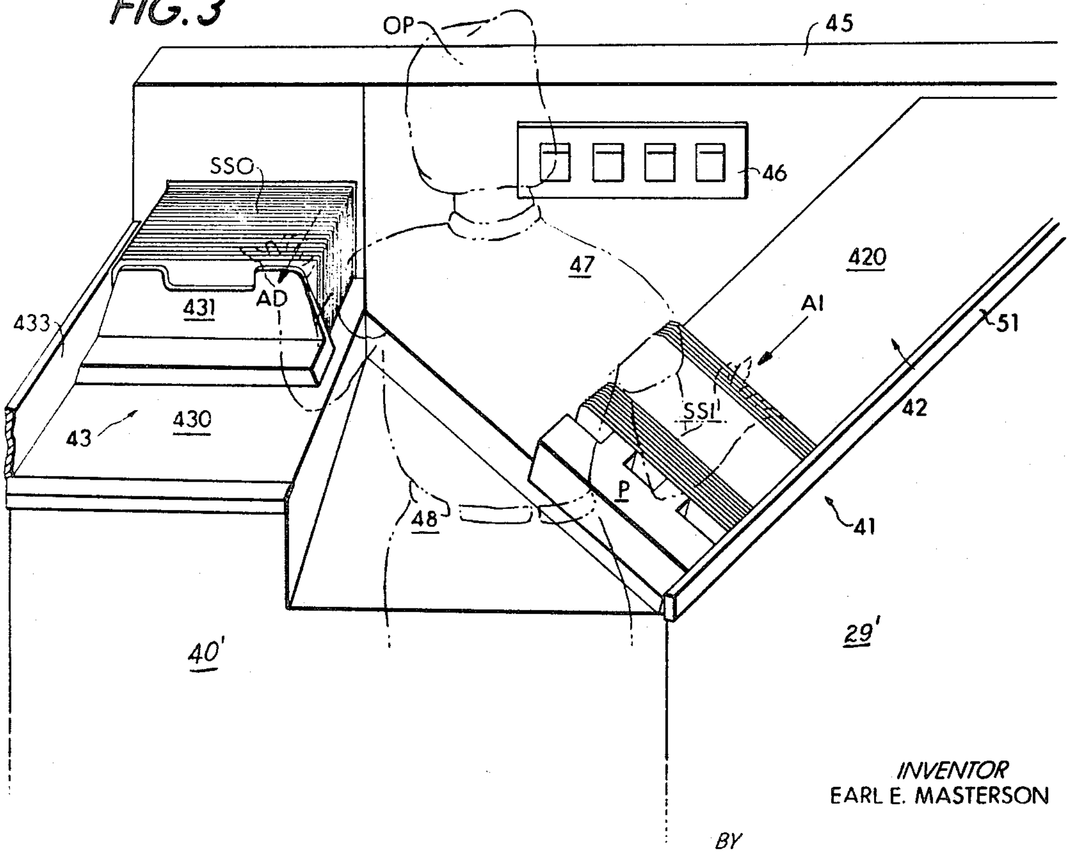
FIGURE 3 is a front perspective view of a card reader embodiment of the invention shown in relation to the physique of a typical human operator (in phantom)

In an effort to avoid the above-mentioned shortcomings of prior art card-handling machines, it appeared desirable to locate both the input and the output hoppers so that the card stacks therein lay along hopper bases that are relatively coplanar. A plan view of such an arrangement (over-simplified) is indicated in FIGURE 2, wherein surface S is intended to schematically represent a top surface of a card-handling machine M on which are located an input hopper 1, containing a stack of cards S1, and an output hopper O, containing a stack of cards SO, the cards of both hoppers being arranged to be transported in the directions indicated by the arrows. Thus, surface M is coplanar with the bases of hoppers I and O so that all are close to a common (e.g. waist) level for access by attendant OP, unlike analogous elements 17, 7 and 1 respectively of the machine 10 in FIGURE 1. It will be perceived that this arrangement also allows a relatively simple and direct transport path *t* between hoppers.

However, a disadvantage is that machine M is relatively deep (along direction D) and bulky, and also prevents operator OP from reaching cards located in the remote ends of both hoppers from a single position, i.e. without moving or straining considerably.

As a modification of this arrangement, therefore, it appeared that one might bring the input hopper I closer to the operator, as shown in phantom at I', so as to bring both card stacks SO and SI, within easy reach. However, this arrangement has disadvantages in that it sets up aternate transport paths T'1, T'2, both of which require turning transported cards through a total of 180°—something to be avoided, if possible, since every sharp (e.g. 90°) turn can damage cards and slow them down, reducing card throughout speed. That is, if stack SI faces in one direction (arrow *a*), cards must be transported along path T'1 which traverses two 90° turns and also is undesirably long. Facing stack SI in the opposite direction, (arrow *a'*) to be transported along path T'2 is no solution since their order will be reversed in transit between the two hoppers unless the cards are flipped over (a 180° turn, indicated at loop T'20). A machine designer will avoid this very cumbersome, problematical "card-flipping" manipulation if he possibly can. The above-mentioned problems associated with other card-handling structures are largely resolved using an improved arrangement as shown in FIGURES 3–8.

FIGURES 3–7 illustrate one embodiment comprising a unit record handling machine of the card reading type for sensing data from punched-card records. The cards are to be loaded in stacks into card reader 41 by an operator OP at an input hopper 42. From hopper 42, the cards are separately selected (picked) by a picker P, to be transported past a card processing station (e.g. read station R, FIGURE 4) and thereafter, to be ejected and stacked along an output container, or stacking platform, such as in output hopper 43. It will be seen that the general horizontal cross-sectional outline of the card-reader apparatus 41 is relatively triangular. This "delta" shape places within easy reach of operator OP (positioned as shown) all of the cards stacked in both hoppers 42, 43, plus the inclined work-surface portion 44 therebetween and the control panel 46 mounted on surface 47. As noted particularly in FIGURES 3 and 7, machine 41 is defined between a pair of oblique sidewalls 29', 433' (433' may be lower extension of hopper rail 433) to assume this "delta" configuration, together with rear wall 45' (under shelf 45), there also being a relatively short forward wall 40' connecting sidewalls 29', 433'.

Figure 4:
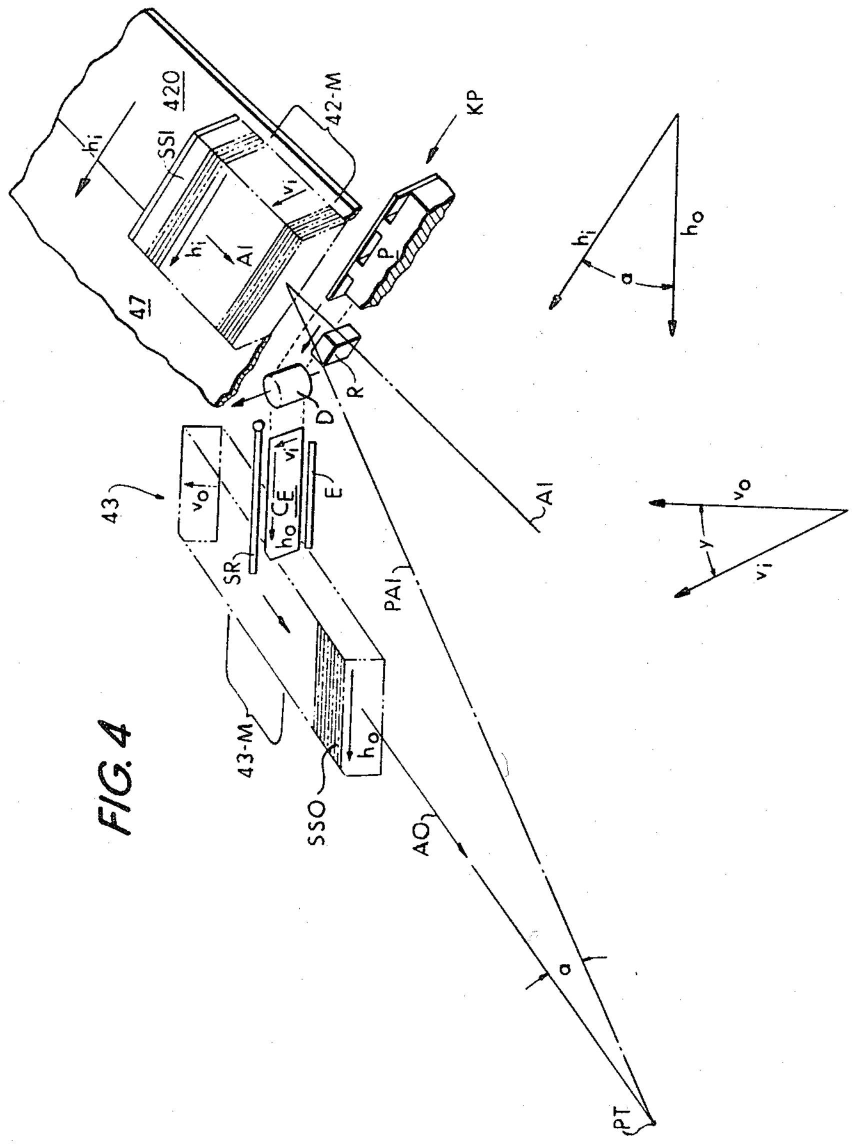
FIGURE 4 is a schematic representation of the card-advancing and storage portions of the embodiment in FIGURE 3.

Thus, card reader 41 comprises an input hopper portion 42, an output hopper portion 43, a pair of working surfaces between the hoppers, namely a level shelf 48 and an inclined working surface 47. Input hopper 42 includes an inclined base portion 420 and a rail portion 51. Output hopper, or stacker 43 includes a flat, level base portion 430, a sidewall 433 and an associated card pusher means 431. Table 47 may preferably be coplanar with the base 420 of input hopper 42 and carries control panel 46. Working surface 47 is inclined upwardly to intersect a level top shelf portion 45 at the rear of reader 41. As will become more apparent hereinafter, these elements of reader 41 are functionally adapted to process cards as follows: Operator OP may initiate reader 41 in a particular mode by selecting proper controls on panel 46 and inserting stacks of subject cards into input hopper 42, for instance, selecting the cards from an adjacent receptacle, or from shelf 48 or output hopper 43. When processing is initiated, picker P is caused to thrust individual cards sequentially from an input stack SSI in input hopper 42 toward internal transport means to be advanced serially, i.e. short-edge first, past a reading station R (see FIGURE 4) and thence to an eject station, from which an ejector means (E, FIGURE 4) may thrust them to be stacked in an output stack SSO, along output hopper 43. As FIGURE 4 shows, a stack roller means SR is provided to direct cards between ejector E and output stack SSO, also straightening them from their tilted, or inclined attitude. That is, input hopper base 420 has been tilted (e.g. about 45°) relative to output hopper base 430 to define a plane of vertical inclination. Cards are preferably maintained inclined at this reference inclination until ejection, i.e. the height axes, or height (relatively vertical) dimensions thereof are controlled so that the height axis $v_i$ of injected cards is kept parallel between input hopper 42 and ejector E. Dimensional axis $v_i$ is inclined preferably at about 45° (angle *y*) from that of cards in output hopper 43, namely axis $v_o$. Such a vertical inclination provides a gravity feed for injected cards making them self-injecting along input hopper 42 toward picker P.

According to one feature of the device, hoppers 42, 43 are at relatively common height, that is, at least some portions thereof intersect a common vertical level, or lie closely adjacent thereto. Thus, stacker base 430 may be level with the floor which supports machine 41, while the mid-section 42–M of the inclined base 420 of hopper 42 may be disposed to intersect the plane of base 430. Stacker base 430 will thus define a reference plane which is preferably at a "waist-level" for the typical operator (standing or seated) and provides numerous advantages such as vertical accessibility, as above related. It will also be noted that hoppers I, O of machine M in FIGURE 2 have coplanar, preferably waist-level, base portions. It will be apparent that such coplanarity brings machine elements into better relation with an attendant improving their vertical accessiblity.

*Convergence*

According to another feature of the device, hopper 42, 43, besides being coplanar, also converge adjacent operator OP in a triangular arrangement. That is, the hoppers are arranged so that the directions along which the cards therein (i.e. directions PA1, AO of card stacks SSI, SSO respectively—FIGURE 4) move are relatively oblique and convergent toward, or alternatively divergent from a common point PT adjacent operator OP. Thus, hopper axes A1, AO are arranged (arrows) to assume directions which converge, or "focus" at point PT, being separated by convergence angle *a*. Convergence angle *a* is preferably about 45°. Otherwise, defining this convergent "focused" relation, it will be understood (see FIGURES 3, 4) that a projection PA1 of input axis AI in the plane of stacking platform 430 intersects output axis AO at a "focal" point PT somewhat adjacent the waist of operator OP. It will be recognized that this converging hopper relation defines the above-described "delta" or triangular machine cross-section. This "delta" arrangement compacts machine elements laterally and thus improves the lateral accessibility of stacked cards, controls, etc. to the operator, as aforesaid. It will be recognized that the input and output cards (in stacks SSI and SSO) will thus face toward, or away from a common point (along arrows A1, AO toward PT, FIGURE 4—see also FIGURES 7, 8). The effect upon card orientation in transit of making the hoppers so converge is seen by observing the orientation of the long horizontal card dimensions (or axes) $h$ in the input hopper ($h_i$) and the output hopper ($h_o$). As schematically indicated, dimension $H_i$ is skewed from $h_o$ by angle $a$, since $h_i$ and $h_o$ are normal to hopper directional axes A1, AO, respectively. However, drum D diverts the cards from direction $h_i$ into direction $h_o$ whereas their vertical inclination $v_i$ is not corrected until later, i.e. by stack roller SR fed by ejector E.

Figure 7:
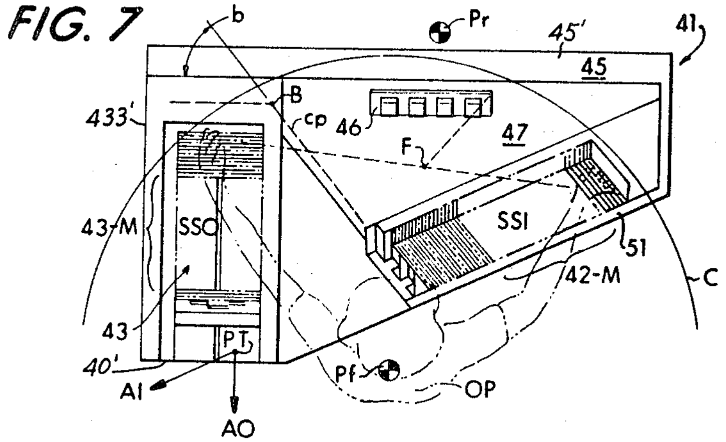
FIGURE 7 is a schematic plan view of the embodiment of FIGURE 3.

A resultant lateral compacting of reader 41 is achieved by this hopper convergence, as seen in the top view of FIGURE 7. This hopper arrangement allows a "delta-shaped" layout of the overall machine, permitting an operator OP to assume a number of convenient working positions $P_f$ in front of machine 41 from which her ambit (i.e. the arcuate path C, defining her extreme reach) will readily embrace all the working zones, or operative areas, of the machine, such as stacks SSI, SSO, controls 46 and working surface 47. A second similar set of operating positions $P_r$ may be found adjacent the rear of reader 41 from which a similar ambit-arc (like C) may be drawn to embrace all of these working zones. Such a machine design may be characterized as "bi-directional," i.e. operable from two directions. Thus, it is important that this arrangement allow operator OP to reach the most remote cards (last in order) in stacks SSO and SSI, especially when input stack SSI is relatively full. In other words, the "delta" arrangement allows the operator to stand (or sit) in one or more positions ($P_f$, $P_r$) which are spaced a minimum distance from the "operating focus" F of the machine. This focus F may be defined as the center of origin of minimum radii to extreme manipulation zones, such as controls 46, surface 47, etc.

This compacting "focused" hopper layout also improves intra-machine transport modes, by straightening and shortening the required inter-hopper transport path *cp* (FIGURE 7), as aforementioned. It is evident that the "delta" hopper arrangement places the picker means P relatively closer to the ejector E, feeding output hopper 43. Thus, hopper 42 is oriented so that "picked-cards" therein are aimed substantially toward the eject station (along path CP), to which they may be translated without disturbing their inclination. It should also be appreciated that transport path *cp* is also rendered free of sharp (i.e. about 90°) turns, requiring only a single gentle bend (B) which may preferably be about a bend angle ($b$) (card-flexure angle) of approximately 45°. This bend may preferably be traversed by directing cards about the circumference of a pivot drum D (FIGURE 4) sufficiently large to flex them gently and gradually around the 45° turn. Drum D preferably will divert cards acutely to assume slightly (less than 90°) different directions in both the vertical and horizontal directions; sending them to ejector E. This two-directional diversion shortens and simplifies card travel as seen, though card inclination is unchanged.

The "delta" arrangement of hoppers, in addition to eliminating stops and sharp turns along card path CP, also facilitates the desirable "broadside feed/serial process/broadside eject" transport mode aforementioned. Thus, as best seen in FIGURE 4, cards may be thrust downwardly (broadside) by picker P to be advanced past read head R serially and, thereafter, thrust transversely (broadside) by ejector E into output hopper 43 and also straightened in vertical inclination. It will be recognized by those skilled in the art that such a record handling apparatus is new and useful having coplanar, converging "focused" hoppers arranged to improve operator access to machine elements and to shorten and straighten inter-hopper transport paths. Such improved access facilitates loading cards into or removing them from hoppers without disturbing continuous feeding and processing operations.

It will be appreciated that the above-described features of focusing convergence and coplanarity of card hoppers have advantageous inter-action. For instance, especially as seen with relation to FIGURES 3 and 7, these features enable an operator OP to manipulate the operative elements associated with card reader 41 from either of two positions ($P_f$ and $P_r$ in FIGURE 7) adjacent the machine center. It will be evident for instance from FIGURE 3 that locating output stacker base 430 at about waist level will, in turn, give machine 41 a low silhouette, allowing an operator to reach over to manipulate cards and controls from the rear (position $P_r$), as well as from the front position ($P_f$). This "bi-directional" operability of reader 41 increases the efficiency of the operator and improves the versatility of machine placement to a great extent. Thus, for example, operator OP may move from the front of reader 41 to the rear position ($P_r$) to inspect or service elements located there, or to operate a companion card reader (similar to reader 41), without losing effective convenient control over reader 41. The invention thus facilitates the operation of a pair of card readers like reader 41 by a single operator.

*Tilting*

According to another feature of the invention, the input hopper 42 is tilted about its own longitudinal axis, to be V-shaped, having only one siderail. As will be more evident from consideration of FIGURES 3, 5 and 6, the input hopper 42 is according to the invention, tilted with respect to the horizontal, i.e. rotated about input axis AI, tending to tilt hopper 42 out of the horizontal plane (e.g. the plane of hopper base 430) and into the plane of inclination. This makes hopper 42 somewhat V-shaped, having only one siderail 51. Stated otherwise, hopper 42 comprises two bases, one base 420 preferably being relatively coplanar with the working surface 47 on the top of card reader 41. This eliminates one of the siderail portions of conventional input hoppers (e.g. side 11' of the machine in FIGURE 1). This may be best seen in FIGURE 5, which is an enlarged detail of the input hopper portion of the card reader embodiment shown in FIGURE 3. Thus, input hopper 42, simplified, may be thought of as comprising an extension 420 of inclined working surface 47 with an orthogonally projecting siderail 51 defining the hopper edge. It will be apparent that input hopper base 420 need not be so tilted merely to satisfy the above-mentioned constraints of convergence and inclination; i.e. input cards (stack SS1) could equally well be "misaligned" from their prescribed output-stack dimensional axes $v_o$, $h_o$ as indicated at $v_i$, $h_i$ by angles $y$, $a$, respectively without tilting input hopper base 420 toward the eject position and without making base 420 coplanar with surface 47. Without this tilting, however, so that base 420 pre-aims picked cards, it would not be possible to compact machine 41 vertically or to simplify card transport as indicated. For instance, so tilting base 420 pre-aims input cards so that they may be translated to ejector E unidirectionally, without disturbing the alignment of height axis $v_i$. Thus, base 420 defines a plane of inclination defined by the bases of cards at input hopper 42, at ejector E and therebetween.

It will be appreciated that the base 420 of hopper 42 being coplanar with working table 47, both surfaces will be similarly inclined with respect to the horizontal. It will be recognized that this tilting of input hopper 42 simplifies card transport between hoppers. More particularly, as seen from FIGURE 4, schematically, hopper base 420 is tilted so that the height axis $v_i$ of cards therein is inclined at angle $y$ with respect to the "vertical" height axis $v_o$ of cards stacked along output base 430. Angle $y$ is chosen so that the transport path (along axis *cp* in the plane of base 420) from input hopper 42 is aimed at the vicinity of the eject station, i.e. at the position of card $C_E$ above ejector E, cards being commonly vertically inclined along this path. Thus, when cards are thrust down by picker P to be aligned along transport axis *cp*, transport means (not shown) will advance them relatively unidirectionally (i.e. disorienting only one dimensional axis *h*) to be turned by pivot drum (transport roller) D and thence, positioned for ejection by ejector E. This "climbing" card-trajectory (from picker P to ejector E) obviously helps to straighten and shorten the transport path, eliminating cornering stops, accelerating card throughput, and the like.

Figures 5, 5A, 6:
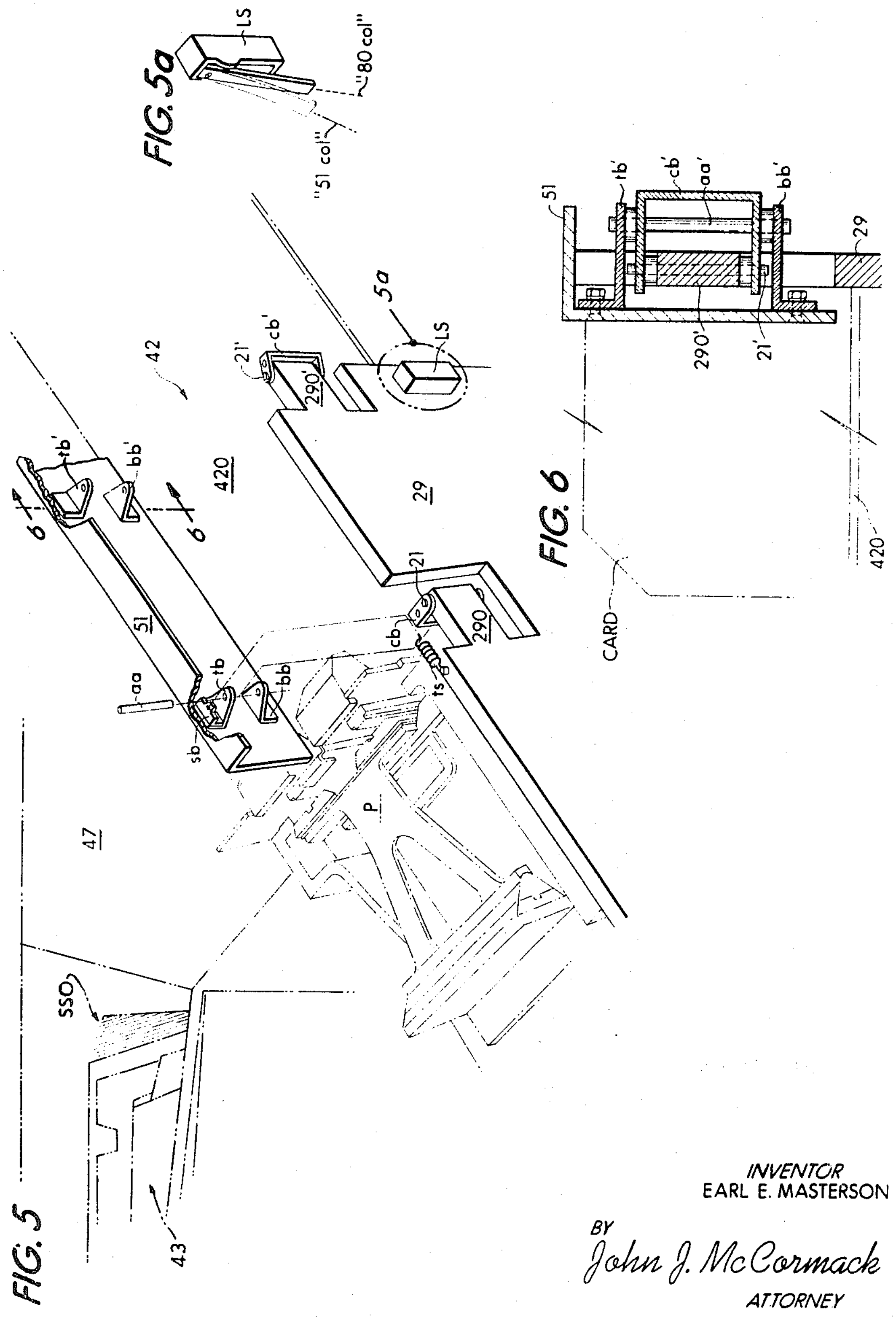
FIGURE 5 is an enlarged, detailed perspective view of an input hopper portion of the embodiment of FIGURE 3, with some parts exploded.
FIGURE 5A is a rear view of an element in FIGURE 5.
FIGURE 6 is a sectional elevation of FIGURE 5.

Tilting hopper 42 also facilitates making it V-shaped which, in turn, simplifies its construction, "opens" it up for easier access, and provides a more stable card V-base. A V hopper is more stable in having two orthogonal bases, rather than one, for engagement of more card edge-area and for guidance in two directions. As seen in FIGURES 5 and 6, hopper rail 51 is pivotably mounted from a wall 29 which is rigidly joined to the main frame of card reader 41. Siderail 51 projects normally from hopper base 420 so that, together, they support two edges of the stacked cards in input hopper 42, rather than one edge, as is usual in the prior art (such as with hopper 1 in FIGURE 1). Thus, a card in "double-base" hopper 42 will tend to be self-aligning along two edges (long and short). Consequently, under the influence of gravity, the cards in hopper 42 may align themselves in the card plane (that is, along the long and short card dimensions) against base 420 and siderail 51 as well as along axis A1, against picker P. Moreover, the increased contact area between the cards and hopper 42 tends to level out the forces urging cards toward picker P so that card-advance is more gradual and controlled, than in the case where there is only a single-edge hopper contact. Since this dual hopper-card contact serves to provide a steady, smooth, reduced load against the picker knives, it thereby relieves a common cause of jams, particularly when a long stack of cards is inserted in hopper 42. For instance, hopper 42 may be adapted to accept about 3000 cards, a quantity that can otherwise bear heavily against picker P so hard as to cause a jam. It will also be apparent that this tilted, V-hopper arrangement advantageously allows an operator to easily slide a card stack from working surface 47 into hopper 42 (i.e. base 420 thereof) with no (siderail) obstruction therebetween and no need to "joggle" the stack of cards so as to prealign them for insertion between chute walls.

This tilted, V-shape of an input hopper according to the invention, also provides improved access to cards adjacent the picker. Operators frequently encounter mutilated cards, especially those used by the inexperienced public, such as charge receipts or other returnable media. At times, an operator will notice such mutilated card in an input stack as it approaches the picker and wish to inspect it and prevent it from causing a "mispick" or other feed-jam. Prior art machines which surround input cards with buffer stations and chute-sidewalls have made this virtually impossible, especially for small card stacks. For instance, with a prior art machine like machine 10 of FIGURE 1 above, it would require a burglar's agility to insert or remove cards adjacent picker 13 though such is often desirable. The invention provides open card-accessibility, however, such as by eliminating buffer stations, chute sidewalls, improving visibility and the like. Prior art card-feeding arrangements, like that shown in FIGURE 1, have commonly required these as aforesaid.

Another feature of the input hopper, according to the invention, is that the siderail 51 is made pivotable so that the width of hopper 42 may be conveniently adjusted, selectably, to accommodate a plurality of card sizes. More particularly, in the embodiment of FIGURES 5 and 6, rail 51 is shown pivotably attached to a pair of tongue portions 290, 290′ of a fixed wall 29, so as to be pivoted between a short card position (51-column card) and a long card position (80-column card). Rail 51 is pivotably carried by a pair of C-shaped brackets *Cb, Cb′* which are, in turn, pivotably journaled along a top edge of tongue portions 290, 290′ on a pair of common pivot axles 21, 21′ (shown projecting therefrom). Thus, brackets *Cb, Cb′* pivot about tongues 290, 290′ while rail 51 pivots (about common axles 21, 21′) relative to brackets *Cb, Cb′*. Wall 29 is cut-out to accommodate the rotation of brackets *Cb, Cb′* through the plane thereof. Rail 51 carries two projecting upper and lower rail bracket pairs, *tb, tb′* and *bb, bb′* respectively, these being rotatably mounted on axles *aa, aa′*, journaled through registering bores in brackets *cb, cb′*. A tension spring *ts* is mounted on wall 29 to engage rail 51 at a spring bracket *sb* thereon, to thereby urge rail 51 into one position or the other, "toggle-wise."

According to another feature of the invention, hopper 42 and pivotable siderail 51 thereon are adapted to actuate a machine-conditioning leaf switch LS during the pivoting excursions of rail 51. More particularly, switch LS (see FIGURE 5A also) is provided adjacent one of the C-shaped brackets (*cb′*) so as to be urged out of its "normal" (e.g. 80-column card) state and into its alternate (e.g. 51-column card) state to cause the application to machine elements of conditioning signals reflecting either the "51-column" or the "80-column" card state of input hopper 42. Thus, the pivoting of rail 51 into position for a given card size can also, automatically, precondition and prepare card-reader 41 to process such a card-size, for instance, by controlling transport means therein and the like.

The above-described feature whereby hopper base 420 is tilted may preferably be combined with a tilting of working surface 47, as noted, so as to make the two surfaces coplanar along a common "tilt-plane." Such an arrangement not only provides ready access from table 47 into hopper 42, walls therebetween having been removed, but also provides a working surface 47 which, being tilted so that its extremities are brought forward towards operator OP, provides more working area within the reach of the operator. For instance, such a tilted surface may carry a control panel (e.g. panel 46) mounted thereon to be within closer easy reach of operator OP; and also to be rendered clearly visible. This also helps to reduce the stretching and straining otherwise necessary for an operator to reach remote control points and contributes greatly to the "man-compatibility" of card handling machines according to the invention. It will be apparent that surface 47 provides a convenient surface for joggling and other operations. Also, such an arrangement greatly facilitates transferring cards from output hopper 43, across inclined table 47 and into tilted input hopper 42 in a single uninterrupted sweep, thus improving handling efficiency. Preferably hopper base 420 and coplanar table 47 are inclined at about 45° with respect to the vertical.

According to another feature of the invention, input hopper 42 is "doubly-inclined," i.e. is not only tilted to be V-shaped, but is also inclined downwardly to have its mid-section at about waist level, bringing both ends of the hopper within easy vertical reach. Thus, it will be noted from FIGURE 4 that input axis AI is inclined downwardly with respect to the horizontal, i.e. downward out of the plane of output hopper base 430 (plane of axis AO and projection P–AI). Thus, input axis AI (parallel to the join-line between base 420 and siderail 51) drops below the horizontal plane of output hopper base 430 by an inclination angle *y*, preferably about 45° as aforestated. Such an incline not only provides the conventional gravity card feed to picker P, but also allows the input hopper 42 to be swung in to be closer to operator OP and closer to output hopper 43, thus reducing the lateral distance it would otherwise extend. Of course, as before stated, the mid-sections of input and output hoppers 42, 43 (that is, sections 42–M and 43–M) are kept relatively coplanar and working surface 47 is preferably also given this downward incline, so that all three surfaces are within convenient vertical reach.

Thus, in summary, according to a preferred form of the invention, hopper 42 is tilted in a compound manner to be both inclined downwardly, about 45° with respect to the vertical, and tilted or rotated about 45° about its own axis so as to be V-shaped, one siderail being eliminated. It is also preferred that an adjacent working surface intersect one base of the input hopper and preferably be made coplanar therewith, so that both assume the above-mentioned compound inclining and tilting attitude.

Figure 8:
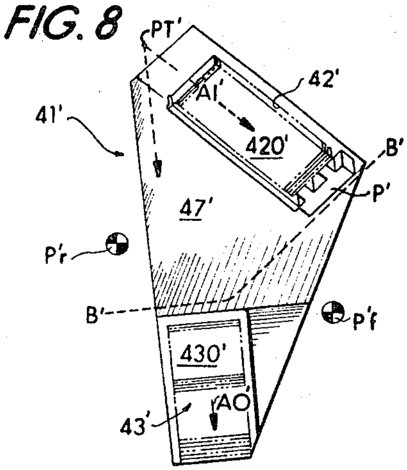
FIGURE 8 is a plan view of another embodiment, similar to that of FIGURE 7, but somewhat modified.

The invention may be better understood by reference to FIGURE 8 wherein an alternative embodiment of a card reader, i.e. reader 41′ is shown, similar to that shown in FIGURES 3–7, but with a somewhat modified hopper arrangement. Thus, alternate card reader 41′ includes a downwardly inclined input hopper 42′, an output hopper 43′ and an intremediate similarly-inclined work surface 47′. Input hopper 42′, as shown, directs stacked cards along an incline along input axial AI, down towards a picker means P′, whence the cards are thrust to be transported (path B′—B′) past a processing station (not shown) and thereafter ejected along an output axis AO′, in output hopper 43′. As with hopper 43, output hopper 43′ includes a base portion 430′ which is relatively horizontal, the mid-section of inclined input hopper 42′ being relatively coplanar therewith. Input hopper 42′ has a base portion 420′ which is tilted downwardly, towards picker P′, and rotated to be V-shaped, being tilted about its own axis AI′, as well as being inclined from the horizontal. Working surface 47′ is similarly tilted and inclined to be coplanar with hopper base 420′. Card reader 41′ may be distinguished, however, from card reader 41 in that input and output axes AI′, AO′ diverge from, rather than converging toward, a common point PT′, establishing a "rightward turning" card path B′—B′, similar to "leftward turning" path *cp* (in FIGURE 7). However, the hopper axes are still "convergent" as above defined; the axes emanating from, rather than toward, common focus PT′. It will likewise be recognized that, similar to reader 41, card reader 41′ can be conveniently operated both from a front operator position $P'_f$ and also from a rear operator position $P'_r$.

The operational features and advantages derived by the invention will be evident from the above but a few will be recapitulated and summarized as follows. Adapting an input hopper to be inclined and also tilted to exhibit a V-base has a number of recognizable advantages, such as improving card alignment, reducing the card-picker load (eliminating buffer stations) improving access to the input card stack, increasing card stability and the like, as aforesaid. Improved alignment provided by the double V-base permits gravitational self-alignment against two card edges (rather than one) to provide a more accurate card-guide than the conventional chute, since the cards will necessarily be referenced against two edges, not one. This is especially valuable for providing a constant side alignment and bottom alignment for cards of slightly differing sizes.

By increasing the engagement area along the card edges, the V-base also improves card-stability, reducing the danger of card "fall-back" so that if the vertical inclination of a hopper is flattened out somewhat to reduce the vertical silhouette of the machine, no appreciable fall-back or other disadvantages need be expected. The increased card-base engagement area and the fritcional drag on the card also tends to resist gravitational-advancing forces driving cards against the picker knives. This vectorially resolves the weight of the card stack so that less bears directly against picker knives, thus making card weight less critical since a smaller component loads the knives. For instance, the difference between 3,000 cards (a full hopper) and a few cards in a nearly empty hopper, becomes much less critical.

Such a reduced picker load will obviously render hoppers arranged according to the invention more apt for employment with load-sensitive flexibly mounted picker knives, such picker knives being mounted on flexures to be freely pivoting, self-centering and very sensitive to card loads. Picker devices having such load-sensitive knives, or analogous means, are well known in the art. Such knives are advantageously used with low stack loads (for instance, with a stack of a few cards—which otherwise might jam a picker) since they react in a card-conforming action to follow bowed cards. Such a picker is also advantageously employed with tilted, pre-aimed card stacks since it is relatively insensitive to being similarly tilted. Such knife means may be advantageously employed with "uni-directional," asynchronous picker means for selecting and advancing cards separately from an input hopper at extremely high speeds and yet with reliable regular alignment. Such knives are interfered with by a heavy stack load however.

Another advantage to such V-base hoppers is that by normalizing loads upon the picker means, as indicated above, they can eliminate buffer stations associated therewith and thus improve access to cards adjacent a picker means, especially for single-card injection or ejection. This is an especial advantage with flexibly pivoted picker knives, as above described, since being load-sensitive, they would otherwise require such a buffer station. The improved accuracy and self-alignment of the V-base hopper thus presents cards to such a picker means in alignment and registration with greatly reduced danger of jamming or overloading.

Tilting input hoppers according to the invention allows removal of one chute-side, eliminating "card-aiming" and opening up access to the hopper. Additionally, when employed in association with a "delta" hopper configuration, and especially for broadside feed-serial process operations therewith, it is advantageous to so tilt the input hopper that cards therein are pre-aimed towards the ejection station.

Further, extending one base of a hopper to comprise a working machine surface improves hopper-access. It will be apparent that access from such a surface to the hopper, with no obstacles therebetween, will be greatly improved whereby an operator can inject a deck of cards by sliding them from the surface into the hopper with little or no lifting, aiming or the like.

Making the other hopper base into a pivotable siderail for convenient adjustment, to accommodate different card sizes, obviously extends the versatility of a machine. This is especially so when the siderail is provided in association with a machine-conditioning switch means to be actuated by the pivoting thereof for automatically controlling the machine in response to a shift in processed card size.

In summary, it will be apparent that the invention above-described provides an improved, novel hopper arrangement for card handling apparatus, where, especially for a relatively "common-level" and convergently-focused arrangement of hoppers, the invention provides an input hopper arranged to have one side removed and to be tilted into a V-shaped configuration to improve accessibility and transport efficiency. When the input hopper is, moreover, inclined with respect to the horizontal and is also made coplanar with a similarly inclined and tilted machine-surface, it will be apparent that the machine is further compacted, that card advancement and picking is simplified and made more convenient, and that the machine organization is made more efficient. When the siderail of the input hopper is, even further, made pivotable and capable of automatically adjusting the machine for different card lengths, machine convenience and operation is evidently further improved. It will be apparent that the principles of this invention can be applied to other related apparatus for handling unit record documents.

While in accordance with the provisions of the statutes, there have been illustrated and described the best forms of the invention known, it will be apparent to those skilled in the art that changes may be made in the apparatus described without departing from the spirit of the invention as set forth in the appended claims and that in some cases certain features of the invention may be used to advantage or substituted for without a corresponding change or substitution in other features.

Having now described the invention, what is claimed as novel and for which it is desired to secure Letters Patent is:

1. In a card-handling machine having a load-sensitive card picker means for receiving cards stacked thereagainst to be processed in said machine, improved card injection means in combination therewith comprising:

a continuous sloped card-handling surface disposed on top of said machine, said surface being inclined downwardly toward said picker means; and guide means including a guide rail projecting normally from, and disposed to guide cards in prescribed alignment along, an edge of said surface toward said picker means, said rail being adapted to be laterally shiftable to assume a plurality of reference axis positions and to thereby conveniently accommodate different respective card sizes to be guidingly aligned with said picker means; said guide means and said surface both being disposed in operative relation with said picker means.

2. The card-handling machine are recited in claim 1 wherein said rail is adapted to be selectively, pivotably positionable so as to guide cards bearing thereagainst along either of two different reference axes with respect to said picker means and is thus adapted to provide for self-aligned, pre-aimed card selection of two different card sizes.

3. The combination recited in claim 2 wherein said injection means additionally includes switch means disposed adjacent said pivotable rail so as to be actuated thereby into one of two bistable conditions and adapted to automatically indicate the pivoted condition of said rail to said machine.

4. The combination as recited in claim 1 wherein said surface is inclined at about 45° with respect to the vertical.

5. In a card-handling machine having a lateral operating axis and a vertical operating axis referenced to a range of convenient operating levels corresponding to the operating positions assumed by machine attendants and picker means which is adapted to be operated with card loads thereon below a prescribed maximum, the improvement therewith comprising:

tilted input hopper means located operatively adjacent said picker means, said hopper means essentially consisting of simply a pair of orthogonally disposed base surfaces arranged at one side of said machine to define an input axis at their juncture, said input axis being oblique to both of said operating axes, said base surfaces being adapted to guide cards stacked thereagainst automatically downwardly towards said picker means; said base surfaces being arranged to span vertical levels only within said operating levels, with one base surface being also extended to also function as a card manipulating surface.

6. The combination recited in claim 5 wherein said picker means and said input axis are disposed so that cards stacked against said base surfaces are automatically pre-aimed at a prescribed processing station within said machine.

7. The combination recited in claim 5 wherein one of said base surfaces is arranged to be pivotable to translate said input axis for accommodating cards of different sizes.

8. A card-handling machine having horizontal and vertical machine axes normal to one another, picker means which is adapted to be relatively sensitive to card loads thereon above a prescribed minimum, said picker means including flexibly pivoted knife means, card ejection means and card transport means arranged to move cards between said picker means and said ejection means so as to maintain one dimension thereof in prescribed constant orientation with said axes; the improvement therewith comprising obliquely disposed hopper means including:

output hopper means operatively disposed adjacent said ejection means and arranged to guide cards therefrom along a prescribed output axis; and tilted input hopper means operatively disposed adjacent said picker means for automatically directing cards down thereto in prescribed alignment along a prescribed input axis with one dimensional axis thereof in said orientation and aligned with said picker means; said input hopper means including: a first base and a second base, said bases being orthogonally disposed at one side of said apparatus to define said input axis by the juncture thereof, said input axis being arranged to be oblique at about 45° to both of said machines axes so as to maintain a low load upon said knife means whereby the flexibility and operation thereof is not impaired, said input axis also being disposed so that cards stacked against said bases are automatically pre-aimed toward said ejection means; said bases being adapted to guide cards stacked thereagainst automatically towards said picker means.

9. The combination as recited in claim 8 wherein one of said bases comprises a bottom surface adapted to align said cards relative the height of said picker means and wherein the other said base comprises a siderail adapted to align said cards laterally with respect to said picker means.

10. The combination as recited in claim 9 wherein one of said surfaces of said input hopper means is extended to comprise a coplanar machine working surface which is similarly inclined and tilted.

11. The combination as recited in claim 10 wherein said positionable base comprises a pivotable rail for selectably accommodating cards of different sizes.

12. The combination as recited in claim 11 wherein said input hopper means includes a machine-conditioning switch means drivenly associated with said pivotable rail to be actuated thereby during pivoting thereof so as to automatically indicate input-card-size to control portions of said apparatus.

13. In a card-handling apparatus having a prescribed picker means the combination therewith of input container means comprising:

a V-hopper including a pair of relatively orthogonal base surfaces oriented to gravity-feed said cards into vertical and lateral alignment with said picker means, one of said base surfaces being laterally-shiftable to accommodate a plurality of card sizes in said apparatus.

14. The combination as recited in claim 13 wherein said laterally shiftable surface comprises a pivotable rail adapted to be selectively shifted to align a selectable one of two different card sizes with respect to said picker means.

15. The combination as recited in claim 14 wherein said rail includes at least two parallel axle means projected therefrom to define a prescribed rail attitude, said axle means being coupled journably to respective bracket means, each said bracket means being journaled in a prescribed wall portion of said machine.

16. The combination as recited in claim 15 wherein each said wall portion comprises a tab cut into a sidewall adjacent said picker means and wherein each said bracket means comprises a U-clamp journably receiving a respective one of said axles and coupled journably onto a respective one of said tabs.

17. A card-handling machine comprising:

a vertically upstanding frame having a pair of relatively parallel front and rear walls and a pair of obliquely disposed sidewalls therebetween, a first one of said sidewalls extending orthogonally between said front and rear walls and the second of said sidewalls extending at an acute angle from said rear wall to foreshorten the length of said front wall; a top output base projecting relatively horizontally from said first sidewall at a prescribed convenient height; eject means disposed to thrust cards vertically onto said base; operator picker means disposed on top of said machine somewhat adjacent said base; said picker means being tilted to aim cards selected thereby relatively unidirectionally toward said eject means; a top sloping surface projecting downwardly from said rear wall toward said picker means and to join the top edge of said second sidewall; and rail means projecting orthogonally from said surface and arranged to guide cards toward said picker means to be pre-aimed therefor.

References Cited

UNITED STATES PATENTS

| | | | |
|---|---|---|---|
| 699,975 | 5/1902 | Reynolds | 271—10 |
| 1,442,997 | 1/1923 | Biver et al. | 271—61 |
| 2,167,823 | 8/1939 | Backhouse | 271—59 |
| 2,777,690 | 1/1957 | Davidson | 271—57 X |
| 3,061,303 | 10/1962 | Glaser et al. | 271—59 X |
| 3,098,249 | 7/1963 | Tice et al. | 271—3 X |
| 3,259,239 | 7/1966 | Elliott | 271—62 X |

FOREIGN PATENTS

| | | |
|---|---|---|
| 660,708 | 11/1951 | Great Britain. |

EDWARD A. SROKA *Primary Examiner.*

J. N. ERLICH, *Assistant Examiner.*